United States Patent [19]
Teller et al.

[11] 3,894,010
[45] July 8, 1975

[54] 3-[2-(THIOACYLTHIO)ALKANAMIDO]-1,4-[CYCLO(1'-CARBOXY)-ALKYLENETHIO]AZETIDIN-2-ONE DERIVATIVES AND THEIR PREPARATION

[75] Inventors: Daniel M. Teller, Devon; John H. Sellstedt, King of Prussia, both of Pa.

[73] Assignee: American Home Products Corporation, New York, N.Y.

[22] Filed: Apr. 16, 1973

[21] Appl. No.: 351,662

[52] U.S. Cl........... 260/243 C; 260/239.1; 424/246; 424/271
[51] Int. Cl. .................... C07d 99/16; C07d 99/24
[58] Field of Search ................................ 260/243 C

[56] References Cited
UNITED STATES PATENTS
3,574,190   4/1971   Hankanen et al................ 260/239.1

Primary Examiner—Nicholas S. Rizzo
Attorney, Agent, or Firm—Richard K. Jackson

[57] ABSTRACT

3-[2-(Thioacylthio)alkanamido]-1,4-[cyclo-(1'-carboxy)alkylenethio]azetidin-2-one derivatives possessing antibacterial activity are produced by the reaction of a carbodithioic acid 1-carboxy(lower)alkyl ester and a 3-amino-1,4-[cyclo(1'-carboxy)alkylenethio]azetidin-2-one derivative in the presence of a condensing agent.

8 Claims, No Drawings

3-[2-(THIOACYLTHIO)ALKANAMIDO]-1,4-[CYCLO(1'-CARBOXY)-ALKYLENETHIO]AZETIDIN-2-ONE DERIVATIVES AND THEIR PREPARATION

DESCRIPTION OF THE INVENTION

In accordance with this invention there is provided a group of azetidin-2-one derivatives which are active antibacterials. More specifically, the compounds of this invention may be generically described as 3-[2-(thioacylthio)alkanamido]-1,4[cyclo(1'-carboxy)alkylenethio]azetidin-2-ones. The structural formula of the new compounds is as follows:

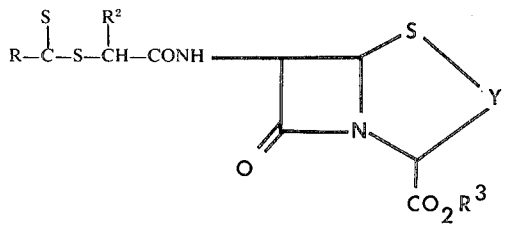

wherein:

R is a member selected from the group consisting of (lower)alkyl, cycloalkyl of 5 to 7 carbon atoms, aryl of 6 to 10 carbon atoms, (lower)alkoxy aryl of 8 to 12 carbon atoms and 2-thienyl radicals, $R^2$ is a member of the group consisting of —H, (lower)alkyl, phenyl and carboxyl radicals;

$R^3$ is a member of the group consisting of —H and an alkali metal cation; and

Y is a member selected from the group consisting of

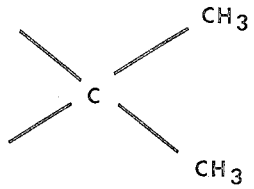 and 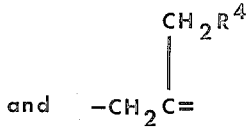

in which $R^4$ is —H, (lower)alkanoyloxy, N-pyridinium,

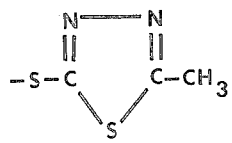 or 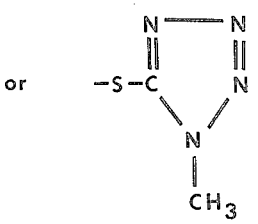

The expression 1,4-[cyclo(1'-carboxy)alkylenethio], used in the generic name for the compounds of this invention is intended to embrace the 1-carboxy bridge member

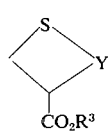

as it appears in the preceding paragraph. The term "lower", used to modify alkyl and alkanoyloxy is intended to designate those groups containing from 1 to 6 carbon atoms.

The 3-[2-(thioacylthio)alkanamido]-1,4-[cyclo(1'-carboxy)alkylenethio]azetidin-2-one derivatives of this invention are prepared by the reaction of a carbodithioic acid 1-carboxy-(lower)alkyl ester and a 3-amino azetidinone derivative designated $H_2NR^5$ in the presence of a condensing agent according to the equation

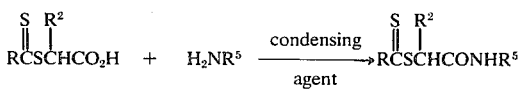

in which $R^5$ is the azetidinone moiety of a penicillin or cephalosporin and R and $R^2$ are defined, supra. The condensing agent is such as carbonyl diimidazole, dicyclohexylcarbodiimide, dicyclohexylcarbodiimide in the presence of N-hydroxysuccinimide or 1-hydroxybenzotriazole, isobutylchloroformate, and the like. These and similar condensing agents which are operable in the preparation of the antibacterial agents of this invention are presented in Spencer et.al., J. Med. Chem., 9, pp. 746–750 (1966); Micetich et.al., J. Med. Chem., 15, pp. 333–335 (1972); Klausner et.al., Synthesis, pp. 453–463 (1972) and U.S. Pat. No. 3,338,896.

The carbodithioic acid 1-carboxy(lower) alkyl ester reactants are prepared by the procedure of Jensen et al., Acta. Chem. Scand., 15, 1087(1961), or by a modification of that process. Thus, the initial reactants, where R is aryl, alkoxyaryl or 2-thienyl, are prepared by the reaction sequence

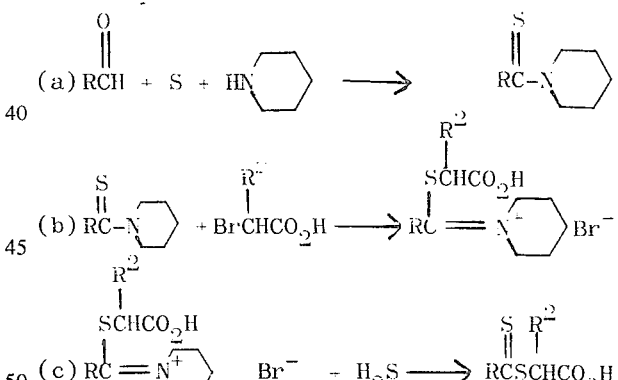

and, where R is alkyl or cycloalkyl, the reaction sequence is modified by substituting the following reactions for step (a):

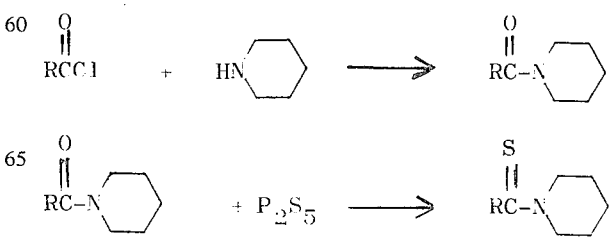

The compounds of this invention are antibacterial agents effective aginst gram-positive and gram-negative test organisms as well as penicillin resistant staphylococcus at an inhibitory concentration at or below 250 micrograms per milliliter using the well known and scientifically accepted agar serial dilution technique. Thus, the compounds of this invention are useful in the fields of comparative pharmacology and microbiology and may be used as growth promoters in animals and for the treatment of infections amenable to treatment with penicillins and cephalosporins. The specific activity of the compounds exemplified in the following examples is provided, infra, for those specific bacterial strains against which the compound was active at a minimum inhibitory concentration at or below 7.81 micrograms per milliliter. It is to be understood that activity against bacteria other than those specifically listed occurs at concentrations above 7.81 micrograms per milliliter. The bacteria are named followed by the specific strain and the concentration in micrograms per milliliter at which 100 percent inhibition occurred. The abbreviations for each bacteria are:

BA SU — *Bacillus subtilis*
ST AU — *Staphylococcus aureus*
NE CA — *Neisseria catarrhalis*

The following examples are given by way of illustration and are not to be construed as limitations upon the true scope of the invention.

In the working examples, the expression ACA refers to aminocephalosporanic acid, APA refers to aminopenicillanic acid and the expression ADCA refers to desacetoxyaminocephalosporanic acid.

EXAMPLE 1

7-(2-Mercaptoacetamido)cephalosporanic acid p-methoxydithiobenzoate.

A solution of dithio-p-anisic acid carboxymethyl ester (1.21 g, 0.005 moles) in dry tetrahydrofuran (20 ml.) containing triethyl amine (0.70 ml.) is cooled to −10°C. Isobutyl chloroformate (0.66 ml.) is added all at once under nitrogen and the mixture stirred at −10°C. under nitrogen another 10 minutes. A solution of 7-ACA (1.36 g, 0.005 moles) in tetrahydrofuran/water (1:1, 18 ml.) containing N, N-diisopropylethylamine (0.87 ml.) is cooled to 0°C. and added rapidly to the above mixture. The temperature of the mixture is maintained at 5°C. for one hour and then 20°C. for another hour. The tetrahydrofuran is evaporated in vacuo < 40°C. A mixture of water (60 ml.) and ethyl acetate (20 ml.) is added to the residue, the mixture shaken thoroughly and the organic layer discarded. Ethyl acetate (60 ml.) is added to the aqueous layer, the mixture cooled to 5°C. and acidified to pH 2.9 with 10 per cent hydrochloric acid. The organic layer is separated, the aqueous layer extracted with ethyl acetate (40 ml.), the organic layer and extracts combined, washed with brine, dried over anhydrous sodium sulfate and evaporated in vacuo < 40°C. to give a red crystalline residue. Recrystallization from acetone/hexane gives the title compound, 0.50 g, m.p. 165°–167°C. (decomp.); $\lambda_{max}^{KBr}$ 5.61, 5.73, 5.82, 5.97, 6.25 $\mu$, $\lambda_{max}^{EtOH}$ 335 m$\mu$ ($\epsilon$ 21,700); NMR has 2.00, 2.03, 3.55, 3.82, 4.30 ppm peaks.

Elemental Analysis for: $C_{20}H_{20}N_2O_7S_3$: Calc'd: C, 48.38; H, 4.07; N, 5.65; S, 19.43. Found: C, 48.75; H, 4.28; N, 5.60; S, 19.28.

| BA SU | 6633 | .0076 |
| ST AU | 6538P | .0076 |
| ST AU | SMITH | .0076 |
| ST AU | CHP | .244 |
| ST AU | 53–180 | .244 |
| NE CA | 8193 | 7.81 |

EXAMPLE 2

7-(2-Mercaptoacetamido)cephalosporanic acid dithiobenzoate.

Using the method described in Example 1 but substituting dithiobenzoic acid carboxymethyl ester (1.06 g, 0.005 moles) for dithio-p-anisic acid carboxymethyl ester and allowing the mixed anhydride to stir at −10°C for 30 minutes instead of 10 minutes gives the title compound on recrystallization from acetone/hexane; 0.40 g. pink solid; m.p. 143°–145°C. (decomp.); $\lambda_{max}^{KBr}$ 5.61, 5.72, 6.00 $\mu$; NMR has 2.09, 3.66, 4.42 ppm peaks.

Elemental Analysis for: $C_{19}H_{18}N_2O_6S_3$ Calc'd: C, 48.92; H, 3.90; N, 6.00; S, 20.65. Found: C, 48.90; H, 3.80; N, 5.96; S, 19.70.

| BA SU | 6633 | 0.0076 |
| ST AU | 6538P | 0.0076 |
| ST AU | SMITH | 0.0076 |
| ST AU | CHP | .244 |
| ST AU | 53–180 | .244 |
| NE CA | 8193 | 7.81 |

EXAMPLE 3

7-(2-Mercaptoacetamido)cephalosporenic acid 2-thiophenecarbodithioate.

Using the method described in Example 1 but substituting 2-thiophenecarbodithoic acid carboxymethyl ester (1.09 g, 0.005 moles) for dithio-p-anisic acid carboxymethyl ester and recrystallization from acetone/hexane gives the title compound; 0.90 g orange solid, m.p. 120°–135°C. (decomp.); $\lambda_{max}^{KBr}$ 5.62, 5.78, 6.00 $\mu$; NMR has 2.08, 3.61, 4.34 ppm peaks.

Elemental Analysis for: $C_{17}H_{16}N_2O_6S_4$ Calc'd: C, 43.21; H, 3.42; N, 5.93; S, 27.15. Found: C, 43.51; H, 3.38; N, 5.72; S, 27.17.

| BA SU | 6633 | 0.0076 |
| ST AU | 6538P | 0.0076 |
| ST AU | SMITH | 0.0076 |
| ST AU | CHP | .244 |
| ST AU | 53–180 | .244 |
| NE CA | 8193 | 7.81 |

EXAMPLE 4

7-(2-Mercaptoacetamido)-3-methyl-8-oxo-5-thia-1-azabicyclo[4.2.0]-oct-2-ene-2-carboxylic acid p-methoxydithiobenzoate.

Using the method described in Example 1 but substituting 7-ADCA (1.07 g, 0.0005 moles) for 7-ACA and recrystallization from acetone/hexane gives the title compound: 0.34 g, pink solid; m.p. 187°–190°C. (decomp.); $\lambda_{max}^{KBr}$ 5.68, 6.00, 6.24 $\mu$; NMR has 2.17, 3.87, 4.23 ppm peaks.

Elemental Analysis for $C_{18}H_{18}N_2O_5S_3$: Calc'd: C, 49.30; H, 4.14; N, 6.39; S, 21.93. Found: C, 50.04; H, 4.67; N, 5.90; S, 21.56.

| BA SU | 6633   | .976 |
|-------|--------|------|
| ST AU | 6538P  | .976 |
| ST AU | SMITH  | .976 |
| ST AU | CHP    | 3.90 |
| ST AU | 53-180 | 3.90 |

EXAMPLE 5

7-(2-Mercaptoacetamido)-3-methyl-8-oxo-5-thia-1-azabicyclo[4.2.0]-oct-2-ene-2-carboxylic acid 2-thiophenecarbodithioate.

Using the method described in Example 1 but substituting 7-ADCA (1.07 g, 0.005 moles) for 7-ACA and 2-thiophene-carbodithioic acid carboxymethyl ester (1.09 g, 0.005 moles) for dithio-p-anisic acid carboxymethyl ester and allowing the mixed anhydride to stir at −10°C. for 30 minutes instead of 10 minutes gives the title compound on recrystallization from acetone/hexane; 0.40 g, orange solid; m.p. 190°-193°C. (decomp.); $\lambda_{max}^{KBr}$ 5.69, 5.77, 6.02 $\mu$; NMR has 2.09, 3.49, 4.35 ppm peaks.

Elemental Analysis for $C_{15}H_{14}N_2O_4S_4$: Calc'd: C, 43.46; H, 3.41; N, 6.76; S, 30.84. Found: C, 43.53; H, 3.71; N, 6.36; S, 30.53.

| BA SU | 6633   | .976 |
|-------|--------|------|
| ST AU | 6538P  | .488 |
| ST AU | SMITH  | .488 |
| ST AU | CHP    | 1.95 |
| ST AU | 53-180 | 1.95 |

EXAMPLE 6

7-(2-Mercaptoacetamido-3-methyl-8-oxo-5-thia-1-azabicyclo[4.2.0]-oct-2-ene-2-carboxylic acid dithiobenzoate.

Using the method described in Example 1 but substituting 7-ADCA (1.07 g, 0.005 moles) for 7-ACA and dithiobenzoic acid carboxymethyl ester (1.06 g, 0.005 moles) for dithio-p-anisic acid carboxymethyl ester and allowing the mixed anhydride to stir at −10°C. for 30 minutes instead of 10 minutes gives the title compound on recrystallization from acetone/hexane; 0.32 g, orange solid; m.p. 157°-165°C. (decomp.); $\lambda_{max}^{KBr}$ 5.62, 6.02 $\mu$; NMR has 2.10, 3.50, 4.39, 2.06 (acetone) ppm peaks.

Elemental Analysis for $C_{17}H_{16}N_2O_4S_3$ ½$CH_3\overset{O}{\overset{\|}{C}}CH_3$
Calc'd: C, 50.74; H, 4.38; N, 6.40; S, 21.98.
Found: C, 49,57; H, 4.05; N. 5.90; S. 21.96.

| BA SU | 6633   | .976 |
|-------|--------|------|
| ST AU | 6538P  | .976 |
| ST AU | SMITH  | .976 |
| ST AU | CHP    | 7.81 |
| ST AU | 53-180 | 7.81 |

EXAMPLE 7

7-(2-Mercaptoacetamido)cephalosporanic acid dithioacetate.

To a solution of dithioacetic acid carboxymethyl ester (0.75 g, 0.005 moles) in dry dimethylformamide (4.0 ml.) at room temperature is added carbonyl diimidazole (0.82 g, 0.005 moles) all at once under nitrogen. Carbon dioxide evolution begins immediately. After thirty minutes at room temperature the residual carbon dioxide is removed under vacuum. The mixture is cooled to −10°C. and a solution of 7-ACA (1.36 g, 0.005 moles) in dry methylene chloride (10 ml.) containing triethyl amine (2.08 ml.) is added all at once. After stirring two hours at room temperature the dark red mixture is concentrated at < 40°C. n-Butanol (5.0 ml.) is added, then potassium ethyl hexanoate (25 ml. of 2M solution in n-butanol. After stirring 10 minutes, diethyl ether (100 ml.) is added, the product filtered and dried in vacuo at toom temperature to yield the product; 2.15 g, red solid; m.p. 102°-118°C. (decomp.). Purification by dissolving in ethanol, filtering off a small amount of insoluble material and precipitation with diethyl ether gives the title compound 0.86 g brown solid; m.p. 150°-155°C; $\lambda_{max}^{KBr}$ 5.70, 6.28 $\mu$; NMR has 2.17, 2.67 ppm peaks.

| BA SU | 6633   | .976 |
|-------|--------|------|
| ST AU | 6538P  | 1.95 |
| ST AU | SMITH  | 3.90 |
| ST AU | CHP    | 7.81 |
| ST AU | 53-180 | 7.81 |

EXAMPLE 8

6-(2-Mercaptoacetamido)penicillanic acid dithiobenzoate.

Using the method described in Example 1 but substituting dithiobenzoic acid carboxymethyl ester (1.06 g, 0.005 moles) for dithio-p-anisic acid carboxymethyl ester and 6-APA (1.08 g, 0.005 moles) for 7-ACA gives the title compound.

We claim:
1. A compound of the formula:

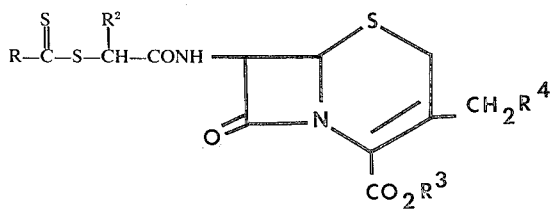

in which

R is a member selected from the group consisting of (lower)-alkyl, phenyl, (lower alkoxy)phenyl, and 2-thienyl;

$R^2$ is a member selected from the group consisting of —H, (lower)alkyl, phenyl and carboxy;

$R^3$ is a member selected from the group consisting of —H and an alkali metal cation; and $R^4$ is a member selected from the group consisting of —H, (lower)alkanoyloxy and N-pyridinium.

2. The compound of claim 1 which is 7-(2-mercaptoacetamido)-cephalosporanic acid p-methoxydithiobenzoate and the alkali metal salts thereof.

3. The compound of claim 1 which is 7-(2-mercaptoacetamido)-cephalosporanic acid dithiobenzoate and the alkali metal salts thereof.

4. The compound of claim 1 which is 7-(2-mercaptoacetamido)-cephalosporanic acid 2-thiophenecarbodithioate and the alkali metal salts thereof.

5. The compound of claim 1 which is 7-(2-mercaptoacetamido)-3-methyl-8-oxo-5-thia-1-azabicyclo[4.2.0]oct-2-ene-2-carboxylic acid p-methoxydithiobenzoate and the alkali metal salts thereof.

6. The compound of claim 1 which is 7-(2-mercaptoacetamido)-3-methyl-8-oxo-5-thia-1-azabicyclo[4.2.0]oct-2-ene-2-carboxylic acid 2-thiophenecarbodithioate and the alkali metal salts thereof.

7. The compound of claim 1 which is 7-(2-mercaptoacetamido)-3-methyl-8-oxo-5-thia-1-azabicyclo[4.2.0]oct-2-ene-2-carboxylic acid dithiobenzoate and the alkali metal salts thereof.

8. The compound of claim 1 which is 7-(2-mercaptoacetamido) cephalosporanic acid dithioacetate and the alkali metal salts thereof.

* * * * *